United States Patent Office 3,141,396
Patented July 21, 1964

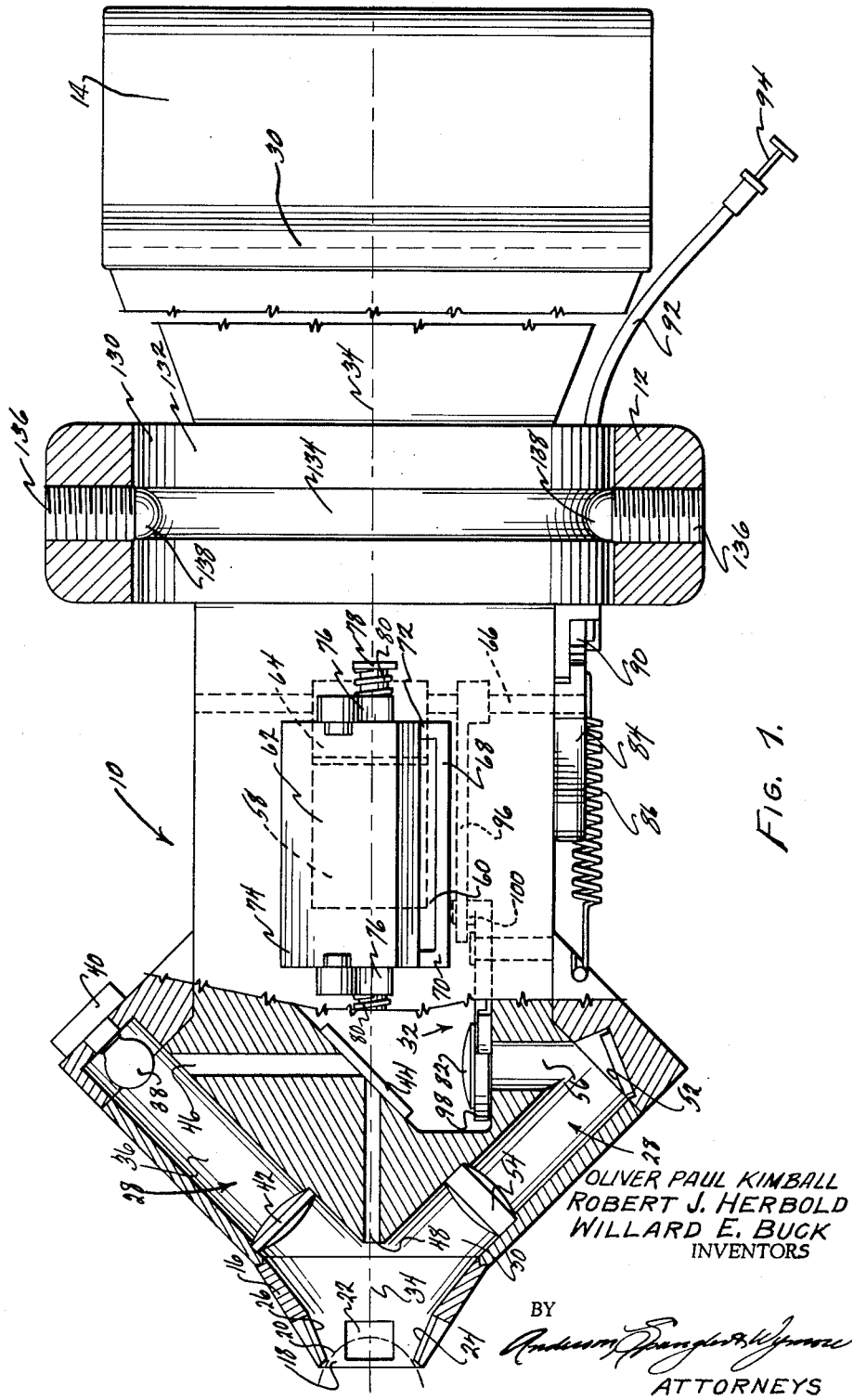

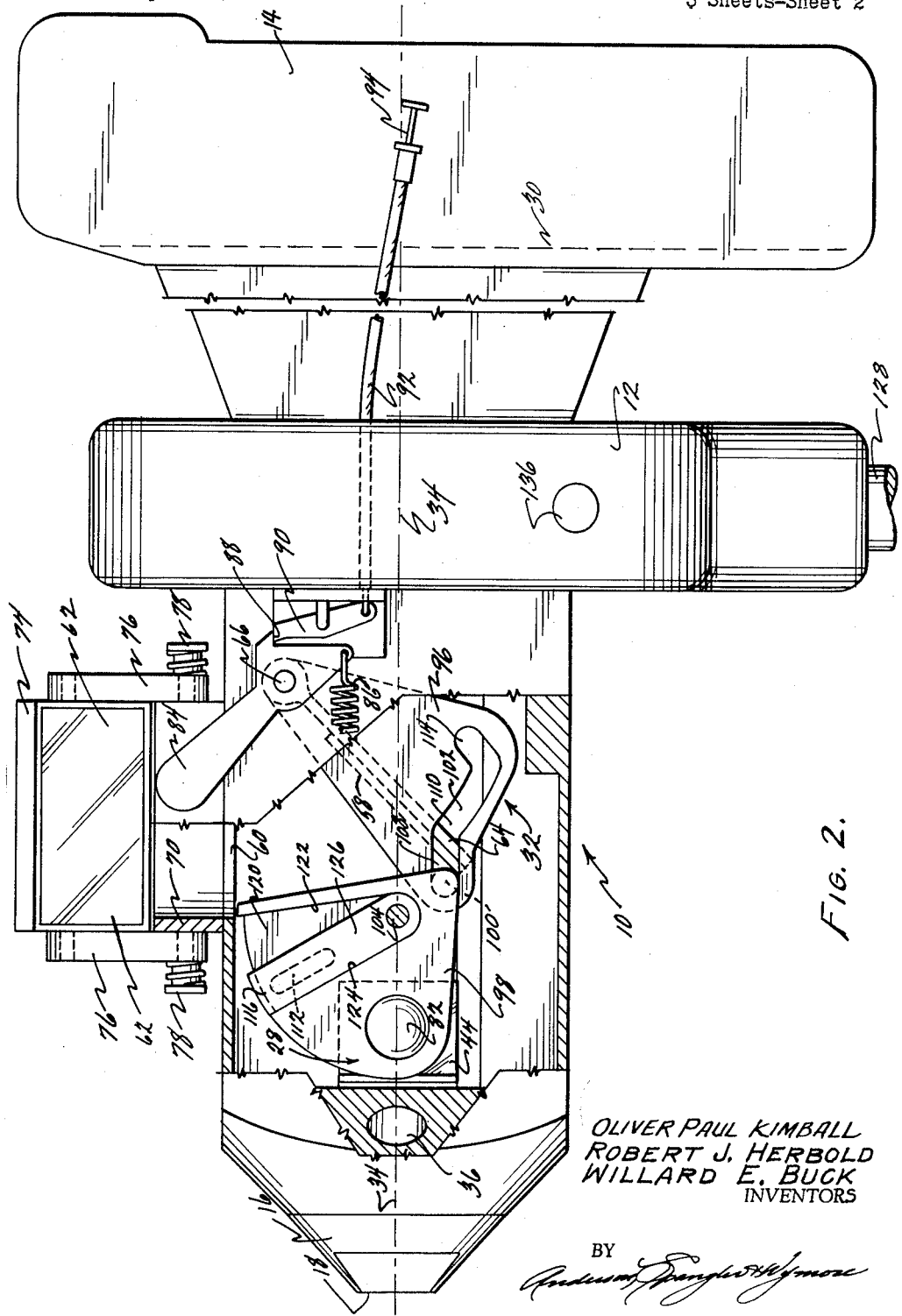

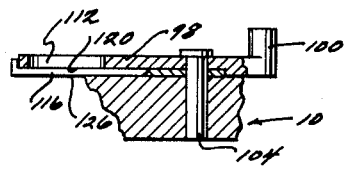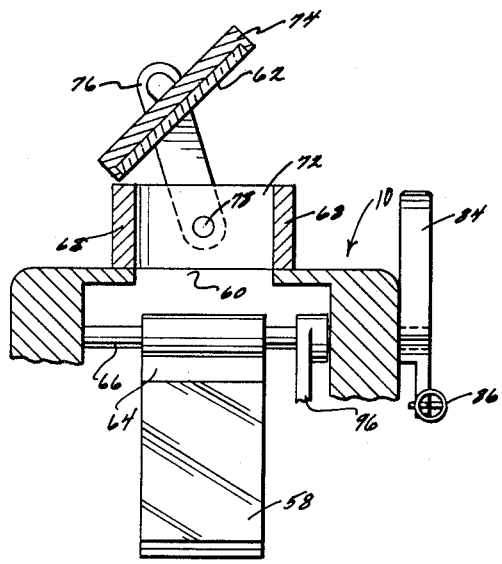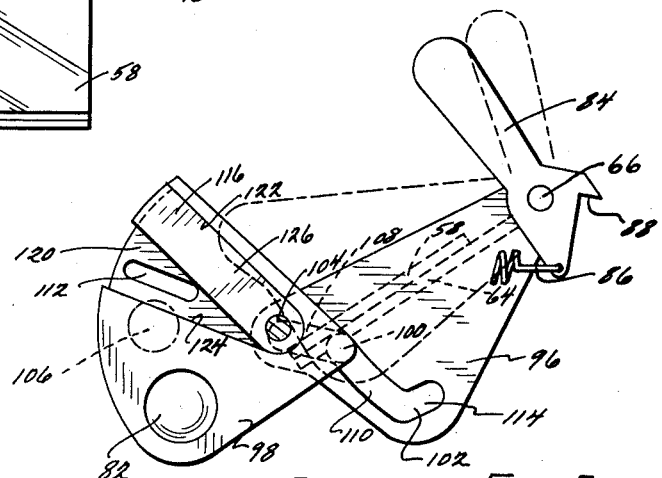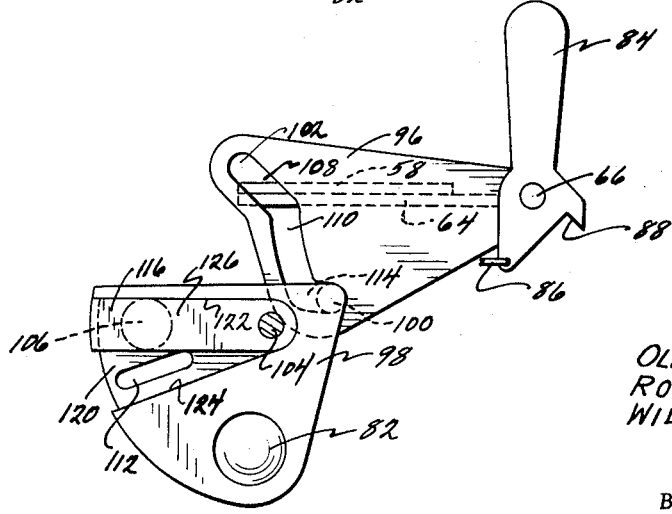

3,141,396
CORNEAL PROFILOMETER
Oliver Paul Kimball, 2465 S. Downing St., and Robert J. Herbold, 2510 S. Columbine St., both of Denver, Colo., and Willard E. Buck, P.O. Box 930, Boulder, Colo.
Filed Sept. 27, 1961, Ser. No. 141,039
17 Claims. (Cl. 95—11)

This invention relates to cameras and, more specifically, to devices of the type aforementioned which are especially designed for use in photographing the contours of the cornea of the eye.

Recent developments taking place over the last few years have made contact lenses a practical and increasingly widely used item, especially for athletes and persons, both men and women, whose appearance demands that they not wear ordinary eye glasses for aesthetic reasons. Most people, however, experience a great deal of difficulty in adapting to the use of contact lenses even of the latest type that cover only that area of the cornea behind which the iris is located. Not infrequently, many months of persistent practice lasting from a few minutes to several hours a day are needed before a person becomes fully accustomed to wearing contact lenses.

While it is undoubtedly true that a considerable amount of practice would be required before anyone would be comfortable wearing contact lenses even if they fit perfectly, there is also no question but that some of the discomfort many patients experience is due, in large measure, to poorly fitted lenses. The eye is an extremely delicate and sensitive organ that demands careful treatment in the hands of highly skilled persons. Thus, a contact lens that must lie for hours against the eye itself must be fitted with utmost precision. There exist, however, few, if any, instruments by which these skilled technicians can determine the contour of the eye with that degree of accuracy demanded for a well fit contact lens.

That portion of the cornea of the eye overlying the iris to which a contact lens must be fitted is only rarely of a uniform contour. Obviously, these irregularities become more pronounced in those persons having some problem with their vision; yet, it is these very people that require some sort of corrective appliance such as contact lenses.

Accordingly, an instrument that would accurately determine and record the exact contours of the cornea of the eye would be of inestimable value to those persons whose profession it is to prescribe and fit contact lenses as well as the manufacturers of such devices. Also, oculists and other doctors engaged in the treatment of eye diseases would have frequent need of such an instrument for purposes apart from prescribing and fitting contact lenses.

The so-called "corneal profilometer" that forms the subject matter of the instant invention achieves the foregoing and other desirable ends by recording photographically the exact contours of the anterior portion of the cornea from any number of difficult angles in the form of silhouettes that accurately reproduce the exposed surface. This is accomplished by passing the parallel rays of a light beam tangentially across the cornea of the eye through a system of lenses and mirrors and past a leaf-type shutter onto a sensitized film. The camera is rotatable through any desired angle thus enabling the contours in an infinite variety of planes to be determined. A suitable viewfinder is provided which enables the operator to visualize the final photograph immediately prior to exposure at which instant a mirror interposed in the light path is removed to redirect the image onto the film plane and a lens also shifted out of the system thus altering the focal length to compensate for the different distances from the cornea to the viewfinder and to the film. A rather unique pivoted leaf-type single-element shutter is also employed in the camera that insures against double exposures when the shutter is recocked and the film has not been removed. Furthermore, the device is adaptable for use with the commercially-available self-contained processing unit that develops finished black and white prints right on the camera within a matter of a few seconds following an exposure. This feature is, of course, highly desirable as the doctor or technician can immediately determine whether or not additional exposures are needed before the patient leaves the office.

It is, therefore, the principal object of the present invention to provide a novel and improved corneal profilometer.

A second object is to provide a device of the type aforementioned that is capable of recording photographically the exact contours of the anterior corneal portion of the eye.

Another objective of the instant invention is the provision of a camera incorporating a novel viewfinder and associated lens and mirror system that instantaneously redirects the image onto the film plane at the moment of exposure while simultaneously changing the focal length of the system.

Still another objective is to provide a camera having a simple single-element leaf-type shutter including means adapted to uncover an aperture upon movement in one direction while covering the latter to prevent double exposure when it is recocked to move it in the opposite direction.

A further objective of the invention herein set forth is the provision of a fixed ring-type support mounting the housing containing the lens system, shutter, light source, diaphragm, mirrors and viewfinder for rotational movement thus permitting exposures to be taken in any desired plane of intersection through the corneal portion of the eye.

Additional objectives are to provide a profile camera that is simple to operate, relatively inexpensive, reliable, rugged, compact, decorative in appearance, safe, versatile and adaptable for use with the commercially-available self-contained processing backs.

Other objects will be in part apparent and in part pointed out specifically hereinafter in connection with the description of the drawings that follow, and in which:

FIGURE 1 is a top plan view, portions of which have been broken away and shown in section while others have been broken away to conserve space, illustrating the corneal profilometer of the present invention and specifically the lens and mirror systems thereof;

FIGURE 2 is a side elevation wherein portions of the housing have been broken away and shown in section to reveal the shutter mechanism while other portions have been broken away to conserve space;

FIGURE 3 is a fragmentary vertical section showing the adjustable viewfinder and associated mirror actuated by the shutter mechanism;

FIGURE 4 is a fragmentary section showing the manner in which the cover for the aperture of the shutter mechanism is pivotally attached to the sector-shaped element thereof;

FIGURE 5 is a fragmentary elevation showing the shutter mechanism after the supplementary lens has moved out of the way but before the viewfinder mirror has retracted; and, FIGURE 6 is a fragmentary elevation similar to FIGURE 5 showing the shutter mechanism following an exposure preparatory to being recocked.

Referring now to the drawings for a detailed description of the corneal profilometer of the present invention and, in particular, to FIGURES 1 and 2 for this purpose, it will be seen to include a light-tight housing that has been indicated in a general way by numeral 10, a stationary ring-type support 12 within which the housing is mounted for rotational movement and a light-tight film holder 14 detachably connected to the rear end of housing 10 for rotational movement therewith. The front end of the housing 10 is fitted with a hollow generally conical eyepiece 16 that is truncated to provide a circular opening 18 adapted to receive a portion of a patient's eyeball represented by dotted lines at 20. The eyepiece 16 is preferably detachably connected to the housing by some suitable connection which will permit ready removal thereof for purpose of sterilization. At best one, and preferably two transparent windows 22 arranged in diametrically-opposed relation, are provided in the eyepiece in position for viewing that portion of the cornea of the eyeball extending therein in order that the latter may be located properly prior to exposure. In addition, the interior surface of the eyepiece is provided with a pair of mirrors 24 and 26 located approximately diametrically opposite one another and angularly spaced from the windows 22 about 90° as shown most clearly in FIGURE 1.

Mirrors 24 and 26 comprise portions of an optical system that has been designated in a general way by numeral 28 and which has as its function the production of a shadow-image or silhouette of the anterior corneal portion of the eyeball on the film plane which, for purposes of illustration is represented by dotted line 30 in the back 14 of the camera. In order to properly describe and orient the various elements of the optical system 28 and shutter assembly, that has been indicated broadly by numeral 32, relative to one another, it is desirable to designate a reference line. For this purpose, dot-dash line 34, henceforth to be designated the "longitudinal axis," that is normal to the film plane 30 and passes through the center of circular opening 18 in the front of the eyepiece 16 will be so used. Ordinarily, this longitudinal axis 34 will intersect the exposable or framed area of the film at its midpoint and also pass through the center of the patient's eyeball located within the central opening in the eyepiece.

Housing 10 is provided with an essentially cylindrical bore or passage 36 located to one side of axis 34 with its center line intersecting the latter at an angle of approximately 45° at a point spaced slightly to the rear of the central opening 18 in the eyepiece, i.e. in front of the eyeball, as shown. A lamp 38 contained in a suitable electrical socket 40 forming a removable part of housing 10, is located in the rearmost extremity of passage 36 to provide a source of illumination. Lens 42 is mounted within passage 36 adjacent the front extremity thereof and is adapted to place the light rays emanating from the lamp in substantially parallel relation to one another or, in other words, concentrate the latter into an essentially cylindrical beam. Mirror 24 is located within the eyepiece 16 in the path of this beam of light and inclined relative thereto in position to reflect same across the anterior corneal portion of the eyeball normal to longitudinal axis 34 thus producing a shadow-image or silhouette of the eyeball's surface on the planar face of the second mirror 26.

The eyeball is also illuminated from the front by means of light from lamp 38 reflected thereon by mirror 44 located on longitudinal axis 34 inclined at a 45° angle thereto. A transverse light passage 46 is provided in the housing, the centerline of which passes through the filament of lamp 38 and also intersects longitudinal axis 34 at right angles thereto. A longitudinal light passage 48 has a centerline coincident with longitudinal axis 34 and intersects transverse light passage 46 at the planar silvered surface of mirror 44. The remote ends of both passages 46 and 48 open onto opposite ends of passage 36. Thus, light from lamp 38 passes laterally across the housing 10 through transverse passage 46 where it is reflected from the silvered surface of 45° mirror 44 forwardly along longitudinal passage 48 and on to the cornea of the eye 20 located within opening 18 of the eyepiece 16. The anterior corneal portion of the eye is also illuminated by light falling directly on one side thereof from lamp 38 and by light from the lamp reflected onto the opposite side by mirror 24.

A second 45° passage 50 similar to passage 36 is located on the opposite side of the housing with its axis on centerline intersecting longitudinal axis 34 at a point coincident with the intersection of the axis of pasage 36 therewith. Thus, passages 36 and 50 are mutually perpendicular and preferably lie in a plane containing longitudinal axis 34. Mirror 26 in the eyepiece is so located and inclined that it reflects the shadow-image from mirror 24 rearwardly and outwardly along passage 50 onto mirror 52 positioned at the rearmost extremity thereof corresponding to the location of lamp 38 within passage 36. From mirror 52, the image is reflected laterally toward the center of the housing 10 where strikes the silvered surface of mirror 44 only on the back side thereof. In other words, mirror 52 is located on an extension of the centerline of transverse passage 46 and inclined such that the image reflected therefrom strikes mirror 44 with an angle of incidence of 45°. The angle of reflection from mirror 44 is, therefore, also 45° causing the shadow-image of the corneal portion of the eyeball to be reflected rearwardly along the longitudinal axis 34 onto the film plane 30 which lies normal thereto. A lens 54 is located within passage 50 and adapted to focus the shadow-image at the film plane where the light-sensitive emulsion is located.

It is significant to note that the light from lamp 38 is effectively blocked off from the film unless it traverses passages 36, 50 and 56, the latter passage being substantially coaxially aligned with transverse passage 46, but on the opposite side of the housing therefrom. When it does so, however, it carries the shadow-image that is to be transferred onto the film. Also, any extraneous outside light passing through the central opening 18 of the eyepiece 16 or through window 22 therein is, likewise, blocked by the rather intricate arrangement of lenses, passages and mirrors and thus prevented from reaching the film. The only direct path to the film lies along longitudinal passage 48 which, of course, is closed at the rear end thereof by mirror 44.

Apart from the shutter mechanism 32 which will be described presently, the camera is essentially complete in the sense that it is fully operative to transmit a focused image of the corneal portion of the eye onto the sensitized emulsion of the film; however, certain incidental, but significant, features are incorporated in the mechanism which materially contribute to its ability and versatility that will now be explained in detail. The operator can avail himself of the window 22 in the eyepiece 16 to correctly locate the patient's eye within central opening 18; but, this tells him little, if anything, concerning the shadow-image or how it will appear on the film. Accordingly, a mirror 58 inclined at an angle of approximately 45° to the image reflected from mirror 44 is interposed between the latter and the film plane on the longitudinal axis 34. This mirror 58 intercepts the shadow-image before it reaches the film while, at the same time, closing off the back 39 of the camera from any extraneous light in the form of reflections and the like. The image from mirror 58 is reflected laterally out through an opening 60 in the sidewall of the housing onto the surface of an adjustable mirror 62 that forms a viewer located exteriorly, all of which can be seen quite clearly in FIGURE 3.

In FIGURES 1, 2 and 3, it can be seen that mirror 58 is mounted on the upper face of an inclined plate 64 which is attached along the rear edge thereof to a transverse shaft 66 mounted between the sidewalls of the housing 10 for rotational movement, one end of the latter projecting onto the outer surface of the housing. Shaft 66 comprises a portion of the shutter mechanism 32, and upon activation of the latter, said shaft turns clockwise about one-eighth revolution as viewed in FIGURE 2 to move the mirror from the 45° downwardly and forwardly inclined position shown therein to the more or less horizontal position of FIGURE 6.

Opening 60 in the wall of the housing 10 is generally rectangular and bordered by an upstanding flange that includes spaced sidewalls 68 and front and rear endwalls 70 and 72, as shown. Mirror 62 is attached to one face of a frame 74 which is, in turn, pivotally mounted between a pair of arms 76. The lower extremities of arms 76 are pivotally attached to endwalls and 72 of the upstanding flange that borders opening 60 by means of pivot pins 78. Compression springs 80 carried on the shank of the pivot pins abutting the heads thereof bias the arms into frictional contact with the sidewalls 70 and 72 to maintain the adjusted position of the mirror. As will be explained presently, the entire housing 10 and back 14 are free to rotate within the stationary ring 12 in order to permit shadow photographs of the eye to be taken at several different angles which will reveal the exact shape of its surface contours. Arms 76 are adjustable and support the mirror for tiltable adjustment which enables the operator to view the image that will ultimately be reproduced on the film in and position through which the camera may be turned about axis 34.

The light rays emanating from lamp 38 pass through double convex lens 42 and emerge therefrom parallel to one another because the filament of the lamp is located at the principal focus of the lens. These same rays reflect parallel from the silvered surface of mirror 24 so that the shadow image received by mirror 26 is neither enlarged nor reduced in size. From mirror 26, the light rays which are still parallel, pass through double convex lens 54 which focuses them at the film plane 30. Mirrors 52 and 44 being planar, do not effect the light beam insofar as altering the focal point of lens 54. Note, however, that the distance the light travels to film plane 30 from lens 54 is considerably greater than the distance to the silvered surface of mirror 62 which is where the image must be focused when mirror 58 is included within the optical system. It is necessary, therefore, to include a supplementary lens 82 in the optical system whenever mirror 58 is a part thereof, said lens functioning to focus the light rays at the plane of mirror 62 rather than at the film plane 30.

The shutter mechanism 32 can best be seen in FIGURES 2, 4, 5 and 6 to which reference will now be made. As has already been mentioned, mirror 58 together with the supporting structure 64 therefor, are carried by shaft 66 which is mounted for rotation between the sidewalls of housing 10. An operating lever 84 is mounted at a point intermediate the ends thereof on the projecting end of shaft 66 externally of the housing 10. A tension spring 86 is connected between a free end of lever 84 and a point on the housing 10 for the purpose of biasing shaft 66 into clockwise rotation as viewed in FIGURES 5 and 6. Operating lever 84 is notched at 88 to receive detent 90 which is mounted for rockable movement about an axis intermediate the ends thereof carried by housing 10. A conventional cable release 92 is secured to the housing and operatively connected to one end of detent 90. Actuation of the cable release by depressing springbiased plunger 94 thereof, functions to pivot detent 90 into position where it is no longer engaged within notch 88 in operating lever 84 thus releasing the latter to the biasing action of tension spring 86 which turns shaft 66 in a direction to raise mirror 58 from the position of FIGURE 2 into the position shown in FIGURE 6. As mirror 58 moves upwardly beyond the position thereof shown in FIGURE 5, it uncovers the light path to the film plane 30 admitting the image thereto while, at the same time, moving into position to effectively close opening 60 in the housing as it occupies the position of FIGURE 6. While mirror 58 is moving out of the way, it is also necessary to remove lens 82 from the optical system so that the image will focus at the film plane 30. Both mirror 58 and lens 82 must be completely out of the optical system before the image is allowed to strike the sensitized emulsion of the film at which instant the actual exposure is made. Also, some means must be provided admitting the image to the film more or less instantaneously.

These and other functions are accomplished by means of a cam plate 96 secured to shaft 66 inside housing 10 and a shutter plate 98 operatively connected to the cam plate. Shutter plate 98 is, in the particular form shown, generally triangular carrying a laterally-projecting pin 100 at its apex which rides in cam slot 102 provided in the cam plate. Shutter plate 98 is pivotally attached to the sidewall of housing 10 by means of pivot pin 104 that is spaced forwardly of pin 100 as shown. Lens 82 is carried by shutter plate 98 in the lower front corner thereof in position to cover the exit of light passage 56 when the shutter mechanism is in the cocked position represented in FIGURES 1 and 2. Upon actuation of the shutter mechanism by means of the cable release, cam plate 96 causes the shutter plate 98 to swing downwardly from the aforementioned cocked position through the position of FIGURE 5 into the uncocked or fully actuated position of FIGURE 6 in a manner which will be explained in detail presently. When this occurs, lens 82 moves out of the optical system and permits lens 54 to focus the shadow image onto the film plane 30.

In FIGURES 5 and 6 the location of the light beam emerging from passage 56 has been represented by dotted line circle 106. As soon as the shutter mechanism is tripped, it is imperative that lens 82 be taken out of the optical system before mirror 58 raises up enough to admit light to the film; hence the lead portion 108 of cam slot 102 is designed to provide maximum travel of shutter plate 98 with a minimum of movement of mirror 58. In other words, the straight lead portion 108 of the cam slot 102, allows the shutter plate to move from the FIGURE 2 position to that of FIGURE 5 which mirror 58 and the associated cam plate have only moved upwardly from the full line position of FIGURE 2 a few degrees into the full line position of FIGURE 5.

Once the shutter plate 98 has reached the position of FIGURE 5, the light beam 106 is completely blocked off thereby and pin 100 has traversed the lead portion 108 of the cam groove; whereupon, the shutter plate remains substantially stationary while cam plate 96 moves from the full line position of FIGURE 5 into the dotted line position thereof carrying mirror 58 upwardly out of the path of the image while the intermediate section 110 of cam slot 102 moves past pin 100.

With both the mirror 58 and lens 82 removed from the optical system, the time has now arrived for admitting the shadow image once again to mirror 44 and, for the first time, onto the film plane where exposure of the sensitized emulsion can take place. An elongate slit-type aperture 112 extending radially from the pivot axis of shutter plate 98 in the path of the light beam 106 sweeps across the latter as said shutter plate moves from the position of FIGURE 6 during which interval pin 100 is traversing the terminal portion 114 of cam slot 102 and the cam plate is traveling between the dotted line position of FIGURE 5 into the FIGURE 6 position. No provision need be made for varying the size of aperture 112, i.e. a diaphragm arrangement, as the light values remain substantially constant for all exposures. Any variations in exposure that appear to be necessary can be accomplished by changing the tension in spring 86 which will alter the shutter speed by moving the aperture 112 across the light beam 106 at a faster or slower rate.

The shutter mechanism is recocked by merely moving operating lever 84 from the position shown in FIGURE 6 through the dotted and full line positions of FIGURE 5 into the position of FIGURE 2 where detent 90 will again fall into notch 88 due to the spring bias incorporated in the cable release 92 that tends to extend plunger 94 while retracting said detent. Note, however, that the act of recocking the shutter mechanism causes aperture 112 to sweep back across the light beam 106 which would double-expose the film if it had not been previously removed from the camera. In order to prevent double-exposures from occurring in this manner, a novel cover 116 for the aperture 112 has been incorporated into the shutter mechanism.

As is most clearly revealed in FIGURE 4, the face of shutter plate 98 that lies against the sidewall of the housing to which it is pivotally attached is provided with a generally V-shaped recess 120 overlying the aperture 112 and extending divergently outward from pivot pin 104. The angularly disposed substantially radial edges 122 and 124 bordering the recess define stops adapted to limit the angular movement of cover 116 relative to the shutter plate, said cover being pivotally mounted on pin 104. The exposed face 126 of cover 116 lies in frictional engagement with the interior surface of the housing as shown in FIGURE 4.

FIGURE 6 shows the position of cover 116 relative to the shutter plate 98 following an exposure. Note that the cover rests against the upper stop-forming edge 122 of recess 120 leaving aperture 112 uncovered. When the shutter mechanism is recocked, however, cover 116 will lag behind shutter plate 98 due to its frictional contact with the sidewall of the housing and move into the position shown in FIGURE 2 covering aperture 116 and resting against the lower stop-forming edge 124. In other words, when in unlocked position, cover 116 intercepts the light beam 106 (FIGURE 6). Then, as the shutter plate 98 moves upwardly into cocked position, cover 116 remains as in FIGURE 6 until the aperture 112 moves in underneath it; whereupon, stop 124 engages the adjacent edge of the cover and carries it along with the shutter plate into the cocked position of FIGURE 2. In so doing, the cover closes aperture 112 while the shutter is being recocked thus preventing double exposures.

Conversely, when the shutter mechanism is tripped, cover 116 remains in the same position in which it is shown in FIGURE 2 due to frictional contact with the housing until the aperture 112 moves out from under same as shutter plate 98 shifts to the position shown in FIGURE 5. Then, stop-forming edge 122 picks up the cover and moves it along with the shutter plate into the FIGURE 6 position thus completing the cycle.

Once again with reference to FIGURES 1 and 2, supporting ring 12 will be seen to comprise the means by which the camera is attached to a suitable base represented by post 128. The body or housing 10 of the camera is provided with an integrally-formed annular flange 130 having a generally cylindrical surface 132 containing a peripheral groove 134. The inside diameter of ring 12 is sized to pass flange 130 and permit relative rotational movement therebetween. At angularly spaced points around ring 12, internally threaded radial openings are provided into which are screwed plugs 136. The inner extremities of these plugs contain hemispherical balls 138 which roll therein and in the peripheral groove 134 in flange 130. Means are thus provided for rotating the camera about its longitudinal axis 34 relative to a fixed support 128.

Back 14 is conventional in that it comprises merely a light-tight box containing the film, suitable storage and take-up rolls therefor (not shown) and provision for inserting and removing same. As aforementioned, the back may, if desired, be of the type which also includes equipment and chemicals adapted to process the film immediately into a finished positive print such as those currently marketed for use on 4 x 5 "Graflex" cameras by the manufacturers of "Polaroid Land Cameras."

Having thus described the several useful and novel features of the corneal profilometer of the present invention in connection with the accompanying drawings, it will be apparent that the several worthwhile objectives for which it was designed have been achieved. Although but a single specific embodiment of the invention has been illustrated and described, we realize that certain changes and modifications therein may well occur to those skilled in the art within the broad teaching hereof; hence, it is our intention that the scope of protection afforded hereby shall be limited only insofar as said limitations are expressly set forth in the appended claims.

What is claimed is:

1. In combination in a camera for recording photographically the profile of the anterior corneal portion of the eye: a housing having an eye piece containing an eye-receiving opening; a light source mounted within the housing; means located within the housing adapted to hold a light sensitive photographic film in a plane positioned to receive light from the source thereof; shutter means positioned between the light source and film holding means operative upon actuation to momentarily admit light to the film; and an optical system adapted to transmit light from the source thereof to the film through the shutter means in the form of a silhouette showing the profile of that portion of the anterior corneal area of the eye projecting into the housing through the eye-receiving opening in the eyepiece, said optical system including first means positioned and adapted to receive light from the source thereof and transfer same in the form of parallel rays laterally across the eye-receiving opening in the eyepiece, second means positioned and adapted to receive the parallel rays from the first means and transfer same to the film in the form of a focused image, and third means positioned to receive light directly from the source thereof and reflect same outwardly through the eye-receiving opening so as to illuminate the front of an eye located therein.

2. The combination as set forth in claim 1 in which the first means of the optical system comprises a first planar reflecting means positioned at one side of the eye-receiving opening in the eyepiece and a first lens means located between said first planar reflecting means and the light source at a distance from the latter approximately equal to the focal length thereof, and in which the second means of said optical system includes a second planar reflecting means positioned on the opposite side of the eye-receiving opening in the eyepiece from the first planar reflecting means and a second lens means located between said second planar reflecting means and the film plane at a distance from the latter equal to the focal length thereof.

3. The combination as set forth in claim 1 in which eye-receiving opening in the eyepiece of the housing is substantially circular and sized to prevent the passage of extraneous light between the edge thereof and the spherical surface of the anterior corneal portion of the eyeball projecting therethrough.

4. The combination as set forth in claim 1 in which the shutter means includes a pivotally-mounted plate having an elongate aperture therein, said plate being mounted in position to intercept the focused image transmitted by the first means of the optical system, said plate being movable upon actuation of said shutter mechanism from a cocked position in which the elongate aperture lies on one side of the light beam carrying the focused image to an uncocked position in which said aperture lies on the opposite side of said light beam, the interval during which said plate moves between its cocked and uncocked positions being sufficient to admit the focused beam to the film as the aperture passes therethrough.

5. The combination as set forth in claim 4 in which means comprising a cover is pivotally attached to the pivotally-mounted plate for movement between an inoperative position in which the aperture is uncovered into an operative position closing said aperture, the housing and shutter means cooperating upon actuation of the latter for movement from cocked into uncocked position to shift the cover from operative into inoperative position at a time prior to the instant the aperture begins to intersect the focused image, and said housing and shutter means cooperating upon movement of the latter from uncocked into cocked position to shift said cover from inoperative position into operative position at a time prior to the instant the aperture reenters the focused light beam thus preventing double-exposure of the film.

6. The combination as set forth in claim 1 which includes an exteriorly-located viewing mirror mounted on the outside of the housing, said housing having an opening communicating the interior thereof in the area between the shutter means and the film-holding means, the shutter means including a tiltable mirror operatively connected thereto located between the film-holding means and the first means of the optical system in position to intercept the focused image emanating from the latter and reflect same through the opening in the housing onto the viewing mirror, said tiltable mirror functioning upon actuation of the shutter means to move into position closing the opening in the housing while uncovering the film-holding means so that the focused image can momentarily strike the film.

7. The combination as set forth in claim 6 in which the distance the focused image travels from the first means of the optical system to the viewing mirror and to the film plane are different, and in which the optical system includes a supplementary lens carried by the shutter means positioned and adapted to refocus the image focused on the film plane at the surface of the viewing mirror, said supplementary lens being operatively associated with the shutter means for movement therewith upon actuation out of the optical system simultaneously with the tiltable mirror.

8. The combination as set forth in claim 1 in which the housing has its interior provided with angularly disposed interconnecting passages containing the first and second means of the optical system and cooperating therewith to block extraneous light entering through the eye-receiving opening in the eyepiece or light directly from the source from reaching the film except when transmitted through the shutter means by said optical system.

9. The combination as set forth in claim 8 in which two of said angularly disposed passages intersect one another adjacent the eye-receiving opening at an angle of approximately 90°, one of said passages containing the first means of the optical system and the other of said passages containing the second means thereof.

10. The combination as set forth in claim 7 in which, the shutter means included a rotatable shaft carrying the tiltable mirror, a pivotally-mounted plate carrying the supplementary lens; said pivotally mounted plate housing an elongate aperture therein positioned to sweep across the focused image following passage of the supplementary lens therethrough, an operating lever secured to the rotatable shaft, spring means connected to the operating lever biasing the latter in one direction, detent means releasably latching the operating lever in cocked position in opposition to the bias exerted thereon by the spring means, and means comprising a cam plate having a cam slot therein operatively interconnecting the rotatable shaft and pivotally-mounted plate, said cam plate and associated cam slot being adapted to function upon release of the operating lever to first shift the supplementary lens out of the optical system while the tiltable mirror remains substantially in place blocking the passage of the focused light beam to the film plane, then moving the tiltable mirror into position covering the opening in the housing while leaving the pivotally-mounted plate in position to intercept the focused image, and finally sweeping the elongate aperture across the focused image to expose the film all during the interval following actuation of the shutter means in which it moves between cocked and uncocked position.

11. The combination as set forth in claim 1 in which the third means comprises a double-faced mirror, one reflecting surface of which receives the light directly from the source thereof and the other reflecting surface being located between the shutter means and film-holding means in position to receive the focused image from the first means of said optical system and reflect same onto the film plane at an angle normal thereto.

12. The combination as set forth in claim 11 in which the double-faced mirror is mounted within the housing spaced directly behind the eye-receiving opening inclined at an angle of 45° relative thereto, the light soure is located to the rear and at one side of the eye-receiving opening in transverse alignment with the double-faced mirror, the film plane is positioned in longitudinal alignment with the eye-receiving opening and double faced mirror spaced to the rear of the latter, and the second means of the optical system includes a planar mirror located in transverse alignment with the light source and double-faced mirror positioned to reflect the focused image through the shutter means onto the opposite face of said double-faced mirror.

13. The combination as set forth in claim 1 in which the shutter means comprises a rotatable shaft, a pivotally-mounted plate having an aperture therein positioned to sweep across the focused image transmitted by the first means of the optical system, an operating lever secured to the shaft, spring means connected to the operating lever biasing the shaft in one direction, detent means releasably locking the operating lever in cocked position, and means linking the shaft and pivoted plate operative upon release of the detent means to actuate said plate for movement between a cocked and an uncocked position during which interval the light is momentarily admitted to the film.

14. The combination as set forth in claim 13 in which means comprising a cover is pivotally attached to the pivotally-mounted plate for movement between an inoperative position in which the aperture is uncovered into an operative position closing said aperture, the housing and shutter means cooperating upon actuation of the latter for movement from cocked into uncocked position to shift the cover from operative into inoperative position at a time prior to the instant the aperture begins to intersect the focused image, and said housing and shutter means cooperating upon movement of the latter from uncocked into cocked position to shift said cover from inoperative position into operative position at a time prior to the instant the aperture reenters the focused light beam thus preventing double-exposure of the film.

15. The combination as set forth in claim 1 in which the housing is elongated defining a longitudinal axis, the eyepiece is centrally-located at the front end of the housing with the eye-receiving opening lying in a plane normal to the longitudinal axis of said housing and concentric therewith, the film-holding means is located at the rear of the housing with the film plane thereof positioned in spaced parallel relation to the plane of the eye-receiving opening, the housing includes first and second light passages extending rearwardly and outwardly in opposite directions from their point of intersection on the longitudinal axis of said housing immediately behind the eye-receiving opening, said first and second light passages intersecting one another at an angle of approximately 90° and said longitudinal axis at an angle of approximately 45°, the light source being located at the rear end of the first light passage, the first means of the optical system comprising a first lens mounted within the first light passage spaced forwardly from the light source a distance substantially equal to the focal length of said lens and a first planar mirror mounted at the front end of the first light passage adjacent the eye-receiving opening on the opposite side thereof from said light source, and the second means of the optical system comprising a second planar mirror positioned at the front end of the second light passage adjacent the eye-receiving opening on the opposite side thereof from the first planar mirror, a second lens mounted within the second light passage spaced along the path of the light beam ahead of the film plane a distance equal to the focal length of said lens, a fourth planar mirror located at the rear end of the second light passage in position to deflect the focused light beam transmitted by the second lens laterally across the housing to intersect the longitudinal axis thereof at an angle of approximately 90° at a point spaced forwardly of the film plane, and a third planar mirror positioned on the longitudinal axis of the housing inclined at an angle of 45° thereto and adapted to intercept the focused light beam from the third planar mirror and reflect same rearwardly along said longitudinal axis onto the film plane.

16. The combination as set forth in claim 15 in which the light source is located in transverse alignment with the third and fourth planar mirrors of the optical system, and in which the fourth planar mirror has a double reflecting surface, one surface of said fourth planar mirror reflecting the focused image from the third planar mirror rearwardly along the longitudinal axis to the film plane while the other of said reflecting surfaces reflects light from the sources thereof forwardly along said longitudinal axis to illuminate the eye-receiving opening.

17. The combination as set forth in claim 15 in which, a viewing mirror is mounted on the outside of the housing, the housing includes an opening aligned with said viewing mirror and the longitudinal axis of said housing and a fifth planar mirror is mounted within the housing between the fourth planar mirror and the film plane, said fifth planar mirror being operatively associated with the shutter means for movement upon actuation thereof from an operative position interpreting the focused image from the fourth planar mirror and reflecting same out through the opening in the housing onto the viewing mirror while blocking the passage of any light to the film plane and an inoperative position covering the opening in the housing while moving out of the path of the focused image reflected from said fourth planar mirror during the interval when the aperture of the shutter means sweeps across said focused image to expose the film.

References Cited in the file of this patent

UNITED STATES PATENTS

| | | |
|---|---|---|
| 1,596,458 | Schiesari | Aug. 17, 1926 |
| 2,279,795 | Nissel | Apr. 14, 1942 |
| 2,586,973 | McMillin | Feb. 26, 1952 |
| 2,629,936 | Cronstedt | Mar. 3, 1953 |